United States Patent [19]

Palz

[11] 3,735,942
[45] May 29, 1973

[54] SPACE STATION WITH SOLAR GENERATORS

[75] Inventor: Wolfgang Palz, Paris, France

[73] Assignee: Centre National D'Etudes Spatiales, Paris, France

[22] Filed: Mar. 4, 1971

[21] Appl. No.: 120,976

[30] Foreign Application Priority Data

Mar. 5, 1970 France..................................7007954

[52] U.S. Cl....................................244/1 SS, 136/89
[51] Int. Cl..............................................H01l 15/02
[58] Field of Search ..........................136/89; 52/108; 244/1 SS

[56] References Cited
UNITED STATES PATENTS 3,620,846 11/1971 Paine........................................136/89
3,169,725 2/1965 Berglund.............................244/1 SS
3,300,162 1/1967 Maynard et al. .....................244/1 SS
3,606,211 6/1969 Roersch et al........................244/1 SS
3,510,086 5/1970 Arbeitlang et al...................244/1 SS
3,532,299 10/1970 Williamson et al..................136/89 X Primary Examiner—Allen B. Curtis
Attorney—Brufsky, Staas, Breiner & Halsey

[57] ABSTRACT

A solar generator has flexible panels adapted to be deployed by means of extensible frame means. The flexible active material of each panel is so arranged and the extensible frames so operated that the development of the panel takes place not only in the longitudinal direction away from the base, but also in the transverse direction. The panels are adapted for use on satellites or other space vehicles.

6 Claims, 18 Drawing Figures

Patented May 29, 1973  3,735,942
5 Sheets-Sheet 1
FIG.:1
PRIOR ART
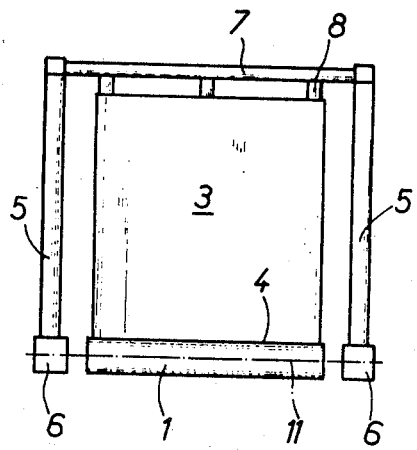
FIG.:2
PRIOR ART
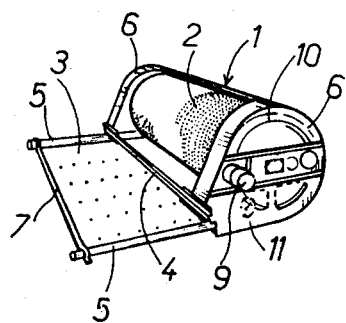
FIG.:3  PRIOR ART
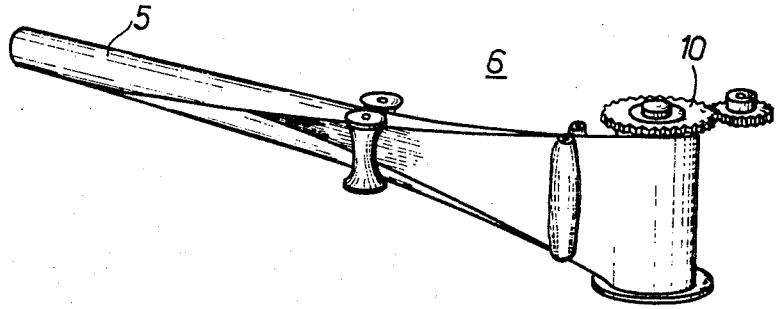

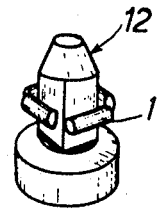
FIG.: 4a
PRIOR ART
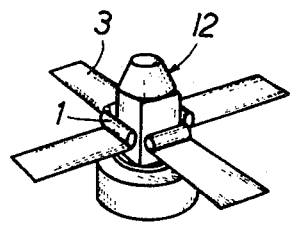
FIG.: 4b
PRIOR ART
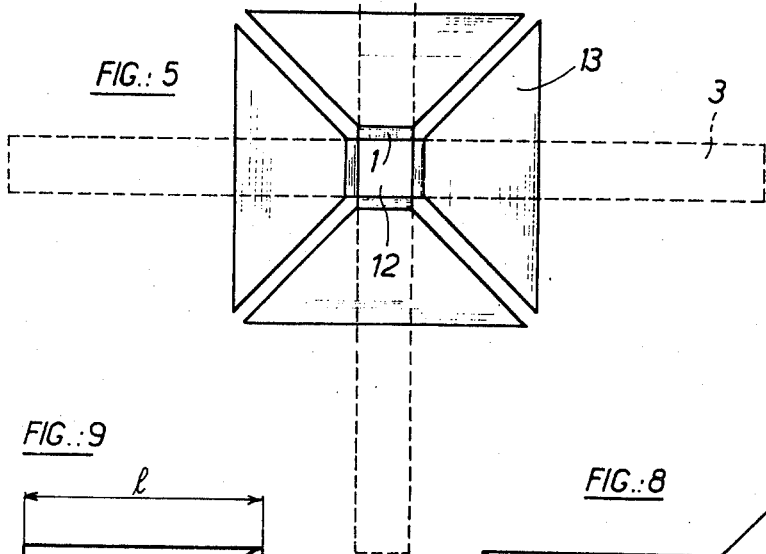
FIG.: 5
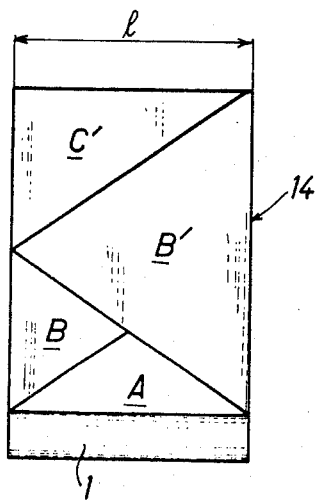
FIG.: 9
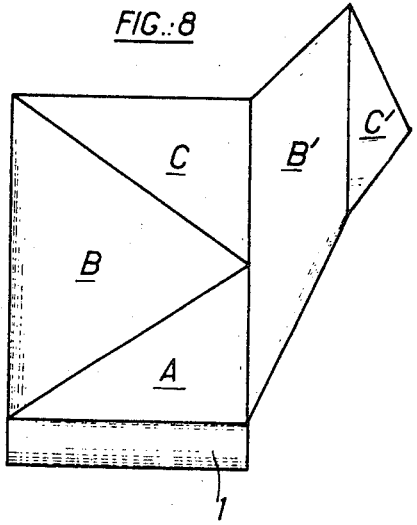
FIG.: 8
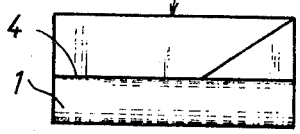
FIG.: 10

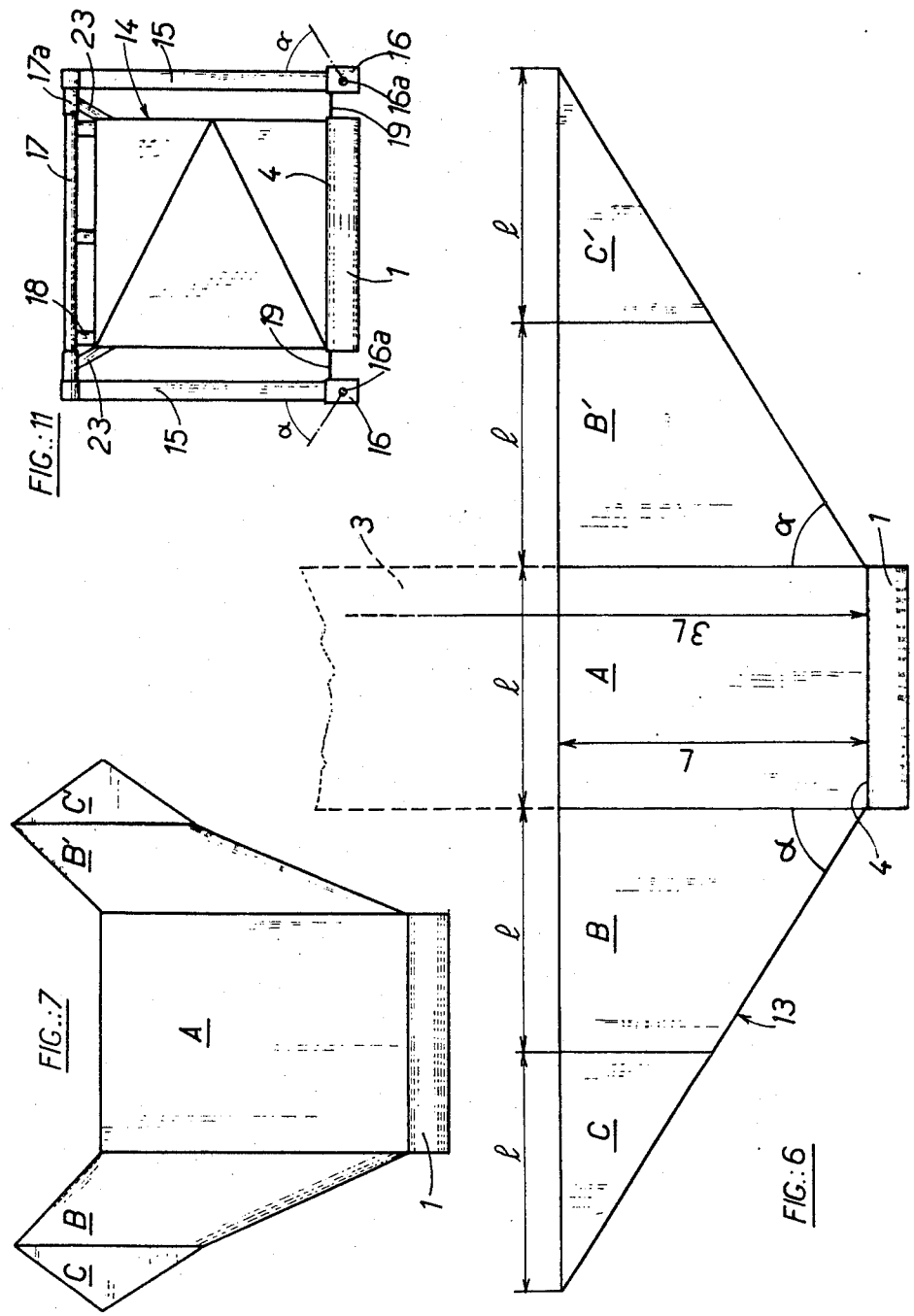

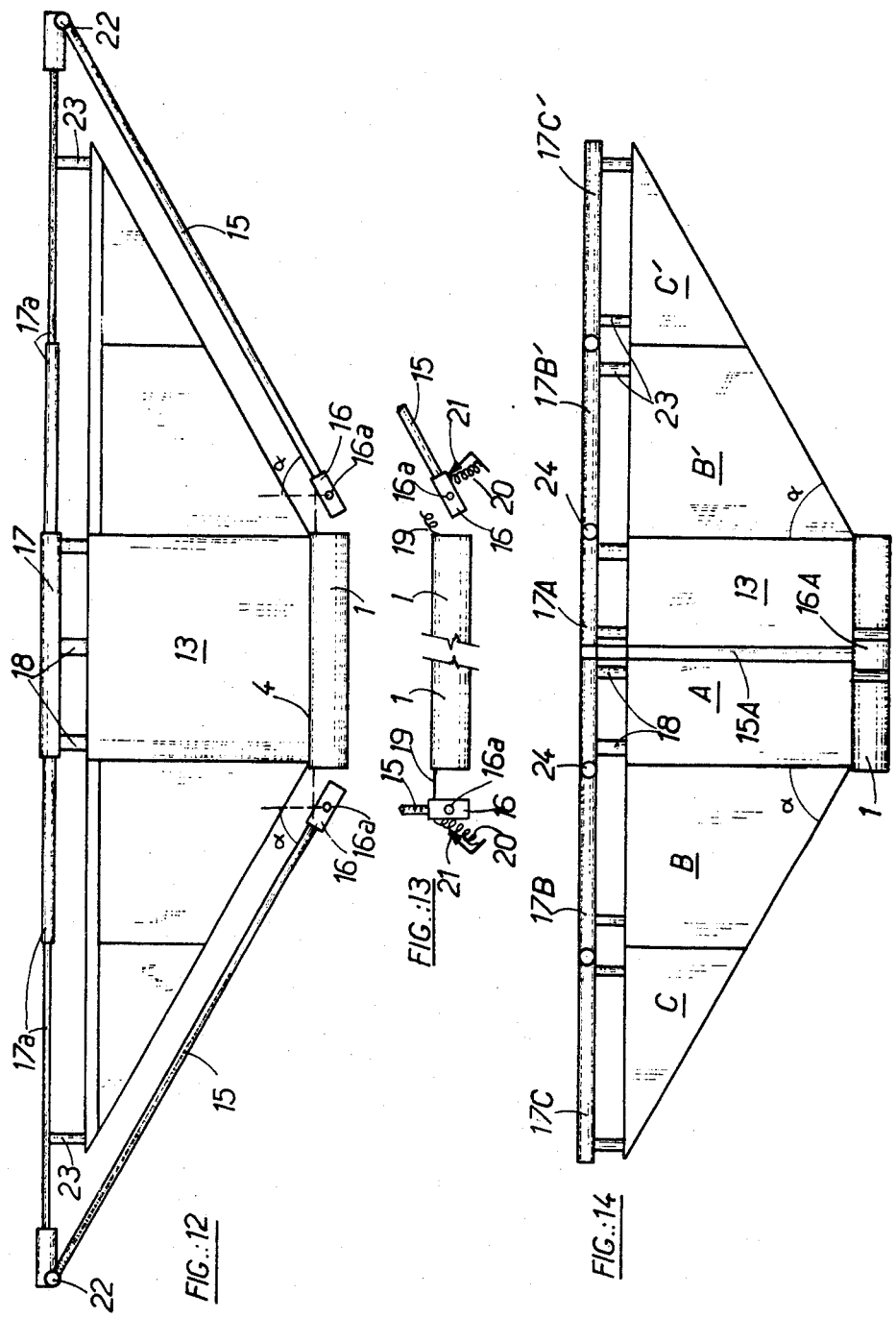

3,735,942

SPACE STATION WITH SOLAR GENERATORS

It has already been proposed to equip artificial satellites with solar generators of high power (of the order of 1 kilowatt or more), made up in large panels for extending outside the satellite, but stored at the start in the fuse cap so that their deployment takes place only in space. Some of these solar panels are flexible, and are folded or rolled up for storing; they are then deployed by means of extensible fittings so that their active surface is spread out. Such systems of flexible, deployable solar panels are well known in aero-space engineering and reference may be made in this respect to various projects mentioned by Doreece D. Abbott in an article entitled "Lightweight large area solar arrays" pages 772 to 777 in the publication "4th Intersociety Energy Conversion Engineering Conference — Washington D.C., September 22–26, 1969" of the American Institute of Chemical Engineers.

These deployable solar panels have generally a rectangular shape, in which the width is limited by the storing and handling conditions. For providing the large surfaces necessary to supply the required electric power, they must, therefore, be very long and this presents certain disadvantages. They may be subject to thermal distortion caused by non-uniform heating of the fittings under solar radiation. The large dimension of the fittings makes the problems of stabilisation and orientation more difficult, and requires complicated solutions. These difficulties will become even greater in view of the anticipated replacement of solar batteries of silicon by solar batteries of cadmium sulphide which are more interesting from several points of view being unbreakable, flexible, light, easy to handle, workable in all dimensions and in the shape of integrated modules, resistant to the radiation particular to outer space, etc..., but have a lower output then the silicon batteries used at present; this lower output must obviously be compensated for by an increase in the working surface and, therefore, by larger dimensions of the solar panels. By way of example, for an identical amount of electrical energy to be produced, the surface of a solar panel for cadmium sulphide is twice that of a silicon panel and, therefore, its length must be doubled for the same width.

The invention has the object of making it possible to reduce substantially problems involved in use of solar panels of the type under review, whilst preserving their performances, avoiding thereby the difficulties which have been outlined above. This result is achieved by a better utilisation of the space surrounding the body of the vehicle carrying the panels.

According to the invention, the active surface of the solar panel is manufactured and the extensible frame is actuated in such a manner that the deployment of the panel does not take place only in the longitudinal direction away from the mounting base but also by spreading out in the transverse direction. The gain in the surface achieved in the lateral direction makes it possible to reduce the length of the panel.

A panel of this kind is formed prior to its deployment by parts which are folded up one on the other to present a generally rectangular element with a plurality of superimposed layers. After deployment the panel has a shape which is no longer the conventional rectangle and approaches the shape of a trapezium with a large angle of aperture.

It is another object of the invention to provide an improvement aiming at a higher degree of rigidity of the deployed panels, at a reduction of the mass away from the body of the vehicle, and at a better distribution of the solar panels relative to the vehicle.

The solar panel, which has always originally the shape of a generally rectangular element with a plurality of superimposed layers, which are folded back one upon the other with a view to the subsequent extension, is combined in accordance with the improvement with a complementary framework such as an additional extensible strut which projects from the body of the vehicle during a second phase of the deployment, in a direction perpendicular or at least largely inclined relative to the direction in which the extraction takes place, causing thereby the unfolding and the transverse spreading out of the panel. The unfolded part of the rectangular original element is transversely removed therefrom, and has the general shape of a triangle or possibly a rectangle, two sides of which radiate from the body of the vehicle and the third side of which, i.e. the side remote from the vehicle, may be free.

It will be noted that the extensible struts or the like, forming part of the supporting frame of the solar generator according to the invention and stored in the retracted position within the body of the vehicle, project in fixed radial directions on deployment so that, in view of their firm mounting on the body of the vehicle, the assembly has a high degree of rigidity. Moreover, the absence of extensible struts along the remote edges of the panels relieves the same considerably, and concentrates the mass substantially in the centre.

The following description, given by way of example and with reference to the accompanying drawings, explains the invention in greater detail.

In the drawings:

FIG. 1 is a much simplified diagrammatical view of a conventional apparatus for unreeling solar panels;

FIG. 2 is a diagrammatical view in perspective of a known construction of such an apparatus;

FIG. 3 is a view in perspective of an embodiment of a strut adapted to be unreeled;

FIGS. 4a and 4b are perspective views of a satellite with known actuation of extensible solar panels;

FIG. 5 is a comparable diagram of such a known actuation and an actuation according to the invention;

FIGS. 6 to 10 illustrate the successive stages of the folding of a solar panel according to the invention;

FIG. 11 is a view corresponding to FIG. 1 but relating to an embodiment of the invention during its deployment;

FIG. 12 shows diagrammatically this embodiment after the termination of the deployment;

FIG. 13 shows a detail of the construction in two different positions;

FIG. 14 is a view corresponding to FIG. 12 but showing a modification of the object of the invention;

Figure 16:
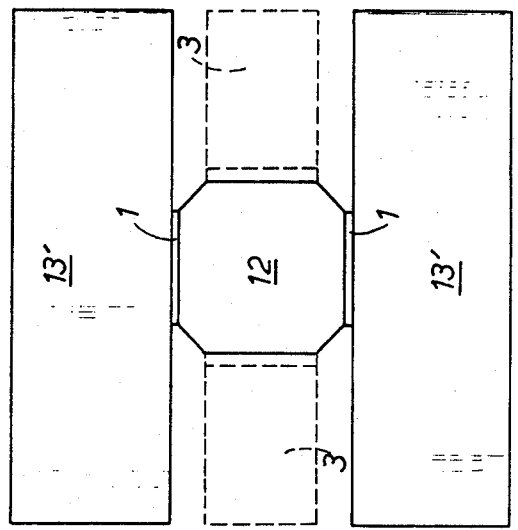
FIGS. 16 and 17 are views corresponding to FIGS. 5 and 12 respectively, but showing a further embodiment of the present invention.

The known device shown in FIGS. 1 and 2 comprises a housing 1 in which is stored a suitably folded or rolled up compact mass 2 of rectangular "skin" of flexible band carrying a plurality of interconnected solar batteries. During deployment this band 3 projects from a slot 4 provided along a generatrix of the housing 1 under the action of two struts 5 adapted to unreel laterally and retained in respective housings 6, and connected at their ends by a fixed cross member 7 to the end of which is fixed the free end of the band 3 by a certain number of mountings 8. The drive is taken from an electric motor 9 through a toothed drum 10, wherein the travel of the extensible struts 5 is synchronised by a transmission shaft 11.

Since the systems for extending rectangular solar panels of this kind are known, it is unnecessary to discuss the structural details of these embodiments. Reference may be made in this respect to the above mentioned article by D.D. Abbott, particularly to the bibliographical references at the end of this article, for example, to the project of the Ryan Aeronautical Company submitted in pursuance of the contract of the Jet Propulsion Laboratory 951, 107 of 21st June 1968.

Merely by way of example, and to indicate the principle, FIG. 3 shows a strut adapted to be unreeled and made by De Havilland of Canada Ltd. Unreeling struts of this kind are well known in the art under the designation "STEM" (storable tubular extendible member).

FIGS. 4a and 4b show the appearance of a satellite before and after the depoyment of known rectangular solar panels 3 arranged in the shape of a cross around the body of the satellite 12.

This distribution is reproduced in dotted outline in the plan view of FIG. 5 and superimposed thereon in solid lines are four trapezoidal panels 13 in accordance with the invention and having substantially the same surface as the rectangular panels 3. It can be easily seen that the general shape of the Greek cross of the known arrangement has been replaced by a form having the general shape of a Maltese cross with a much shorter length of the arm, although the overall surface has remained the same.

The deployment of the solar panels 13 in the form of a trapezium requires various fittings of the skin and of its supporting frame, and further aspects of the invention relate to these fittings, which will be described further below.

The skin is stored as previously known, in the housing 1 in a compact arrangement, e.g. in the shape of a roll, having a width slightly less than the length of the slot 4, so that it can pass therethrough in the shape of a rectangular band. However, compared with hitherto known constructions, this band is not formed by a single layer and comprises sections which are folded back. The width of the outlet slot 4 of the housing 1 must, of course, make allowance for the additional thickness caused by the folded up parts of the panel.

FIG. 6 shows the skin 13 in its fully deployed state. In the embodiment shown, it is divided into a rectangular centre part A having the length L and the width $l$, into two intermediate parts B, B', on both sides of the centre panel A, having the shape of trapezoidal rectangles with the height $l$ and two end parts C, C' beyond the intermediate parts B, B', and having the shape of a right angled triangle with the height $l$. The unit has therefore the shape of an isosceles trapezium with bases having the widths $l$ and $5l$ respectively, and the height L.

It may be seen that the surface of the trapezoidal panel 13 is equal to $3lL$ and that a rectangular panel 3 with the same width $l$ and the same surface would have a length of 3L.

For an optimum distribution in space, an angle $\alpha$ is chosen which is preferably equal or near to 45°. In this case, the length L will be near twice the width $l$.

For fitting the skin into the housing 1, the intermediate parts B, B' are folded over and the outer parts C, C' are folded back along the parallel sides as shown in FIG. 7. Then, one intermediate part B is folded back on the centre part A, then the corresponding part C on the part B as shown in FIG. 8. The same operation is repeated for the other intermediate part B' and its corresponding outer part C', to produce finally the folded rectangular part 14, shown in FIG. 9, having five superimposed layers and a width equal to $l$.

This part 14 may then be rolled up in the housing 1 by introducing it through the slot 4 as shown in FIG. 10, and the full housing fixed to the body of the satellite.

The solar panels are deployed in space in the reverse sequence to the folding described above: first the rectangular part 14 is unreeled from the housing 1 by extracting it through the slot 4 (FIG. 11) and is spread out to its final trapezoidal shape 13 (FIG. 12).

The first of these operations, namely the unreeling of the rectangular part 14, is carried out in the manner usually used for conventional rectangular panels, i.e. by extending struts 15 from their housings 16, and by pulling across element 17 acting on the skin by mountings 18, the second operation, namely the trapezoidal deployment makes use of the innovations to the framework.

The housing 16 for the struts 15 adapted to be unreeled are so mounted that they can pivot through an angle $\alpha$ towards the outside (this angle $\alpha$, preferably about 45°, is substantially the half angle of aperture of the trapezoidal panel 13) about a pivot 16a which is perpendicular to the plane of the panel 13. This inclination may be achieved by breading a mounting 19 (FIG. 13) and by the action of a tension spring 20, wherein the angular travel of the housing is limited to the angle $\alpha$ by an abutment 21. Dash-pots (not shown) or other dampers may preferably be provided to slow down the movement of the struts 15 after the rupture of the retaining mountings 19.

Obviously, it is possible to use other technically equivalent means for pivoting the housings 19, for example servo motors.

The outward pivoting of the struts 15 is accompanied by an extension of the cross bar 17 which is not in this case a simple rigid connection, as in the hitherto known constructions, but must be extensible in the same manner as the struts 15.

By way of example, such an extensible transverse element 17 may be formed by a telescopic radio aerials, preferably with automatic interlocking of blades 17a in the extended position, whilst the ends of the struts 15 are hinged at 22 to the ends of the terminal blades 17a. A motor acting on the cross element 17 is synchronised with the means for pivoting the housings 19 and is preferably used for the lateral deployment. As a modification, it is possible to use as element 17 a preformed spiral known under the designation "STACER" (Spiral Tube and Actuator for Controlled Extension and Retraction) manufactured by the Unter Spring Division of AMETEK Inc. It must be understood that these two examples are in no way exclusive, and other extensible frame elements may also be used, such as distending frames or pantograph-like frames.

Figure 15:
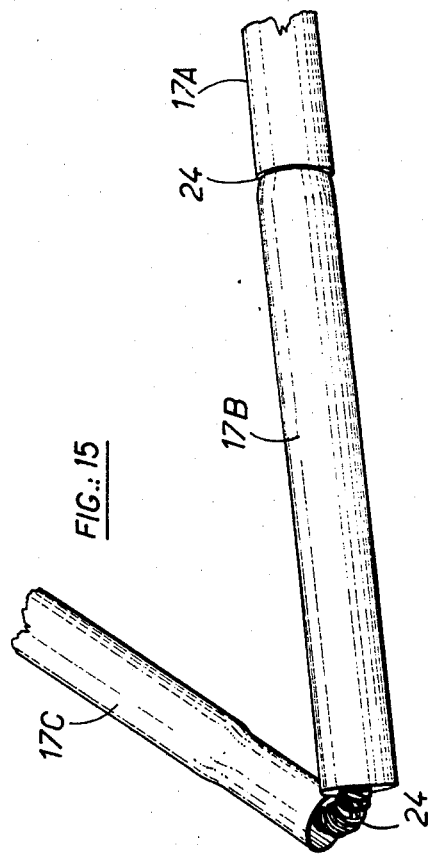
FIG. 15 is a structural detail of this modification.

Moreover, it is not essential to use a cross element which extends necessarily along its own axis and, as shown in FIG. 14, an articulated element, adapted to move about hinges, or systems similar to certain tent poles may be used. One such system is illustrated in FIG. 15.

In this connection, it should be noted that whilst the solution using a telescopic device or a STACER permits the attachment of supplementary mountings 23 towards the points of the trapezoidal panel 13, in addition to the attachments 18 provided in the centre zone, the solution using a hinged folding element permits multiplication of these additional attachments as shown in FIG. 14. In fact, the bar may consist of as many elements 17A, 17B, 17B', 17C, 17C' as the panel 13 has folding parts A, B, B', C, C', wherein the joints 24 between successive elements of the bar are at the points of the lines along which the panel is folded. In this manner, the bar can be folded in exactly the same way as the parts of the panel and unfolded together with the same, whilst each element is permanently attached to its associated sub-panel.

In FIG. 14 the cross bar is connected with its centre element 17A to a single extensible strut 15A, which occupies with its housing 16 a centre position, and which does not pivot.

In all embodiments with trapezoidal panels the outer points of each panel may be provided with interlocking or anchoring systems whereby the four panels are locked together to form a generally square configuration.

The embodiment of FIG. 16 makes it possible to produce an active surface which is almost as large as that of the preceding embodiment (general outline of which is shown in FIG. 5) using only two panels 13' and hence two systems for symmetrical deployment relative to the body of the satellite 12.

Figure 17:
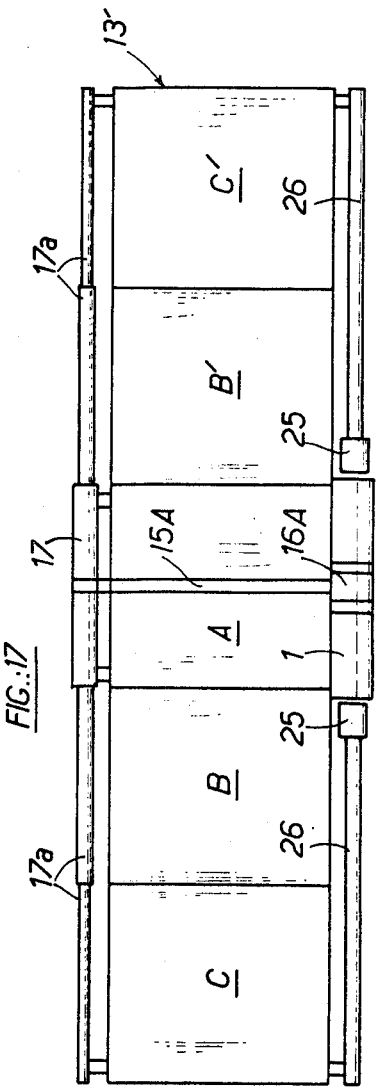

FIG. 17 shows in detail one of the two panels 13': the parts B, C, C', C' of the skin of the panel are fixed not only along their edge remote from the housing 1 to struts 17, 17a as above, but also along their near edges to extensible struts 26. Before the deployment they are stowed away in housings 25 similar to the housings 6 in FIG. 1, but oriented tangentially and no longer radially relative to the body of the satellite 12.

Obviously, it is always possible to improve the utilisation of space by adding on both sides on the body of the satellite 12, in the zones remaining free between the deployed panels 13' with large surfaces two conventional rectangular panels 3 as shown by dotted lines in FIG. 16.

Obviously, the embodiments above described are merely examples which can be modified by substituting technical equivalents without therefore departing from the principle of the invention. The extensible struts may be, for example, pantograph systems, inflatable struts or STACER devices.

Moreover, the skin need not necessarily be rolled up on a reel but may be folded after the manner of an accordion in a housing of rectangular cross-section located at the same point of the satellite as the reel. Finally, instead of providing the driving force for the lateral deployment of the panels at the level of the pivoting housing 16 in the embodiment in accordance with FIGS. 11 to 13 (where the driving force is supplied by springs 20), it may be generally at the level of the extensible cross member 17, by providing at this level servo motors or other driving elements suitable for causing directly the extension of the cross member 17, and thereby the pivoting of the struts 15.

I claim:

1. A space station having a compact body with reduced-size stowing facility aboard said body, comprising:
   a continuous sheet of flaccid material carrying a solar cell array and tailored to stretch out into a generally triangular shape having an overall base length and altitude largely in excess of the size of said stowing facility, said sheet being packable into a package condition of reduced size compatible with that of said stowing facility, and
   a sheet stretcher system comprising relatively rigid extendible struts triggerable from a retracted position and constructed and arranged with said sheet to deploy the same from said package condition thereof, both in a radial direction outward from said stowing facility and in another direction transversely of said radial direction, to a stretched out condition wherein said sheet assumes said tailored triangular shape.

2. Space station as claimed in claim 1, wherein said continuous sheet is packable by folding the same into a generally rectangular multi-layer strip, and winding said rectangular strip into a generally cylindrical package fitted in said stowing facility, said package being unwindable from said stowing facility radially away therefrom into said rectangular strip and unfoldable transversely with respect thereto into said generally triangular shape.

3. Space station as claimed in claim 1, wherein said sheet stretcher system comprises a first transversely extendible strut forming a cross-beam attached to the side of said continuous sheet remote from said stowing facility when said sheet is in said stretched out condition, and a second radially extendible strut connected to said first strut and operable to drive said first strut away from said stowing facility.

4. Space station as claimed in claim 3, wherein said sheet stretcher system comprises two like second radially extendible struts both connected to said first transversely extendible strut and hinged to said body for pivoting away from one another as said first strut extends transversely.

5. Space station as claimed in claim 4, wherein said second radially extendible struts are hingedly connected at their end remote from said body to the opposite ends of said first transversely extendible strut.

6. Space station as claimed in claim 3, wherein said sheet stretcher system comprises a further transversely extendible strut forming a further cross-beam attached to the side of said continuous sheet adjacent to said stowing facility when said sheet is in said stretched out condition.

* * * * *